June 30, 1970  E. ROBERTS  3,518,540

FREQUENCY MEASURING APPARATUS HAVING A VARIABLE TIME BASE

Filed July 6, 1967  2 Sheets-Sheet 1

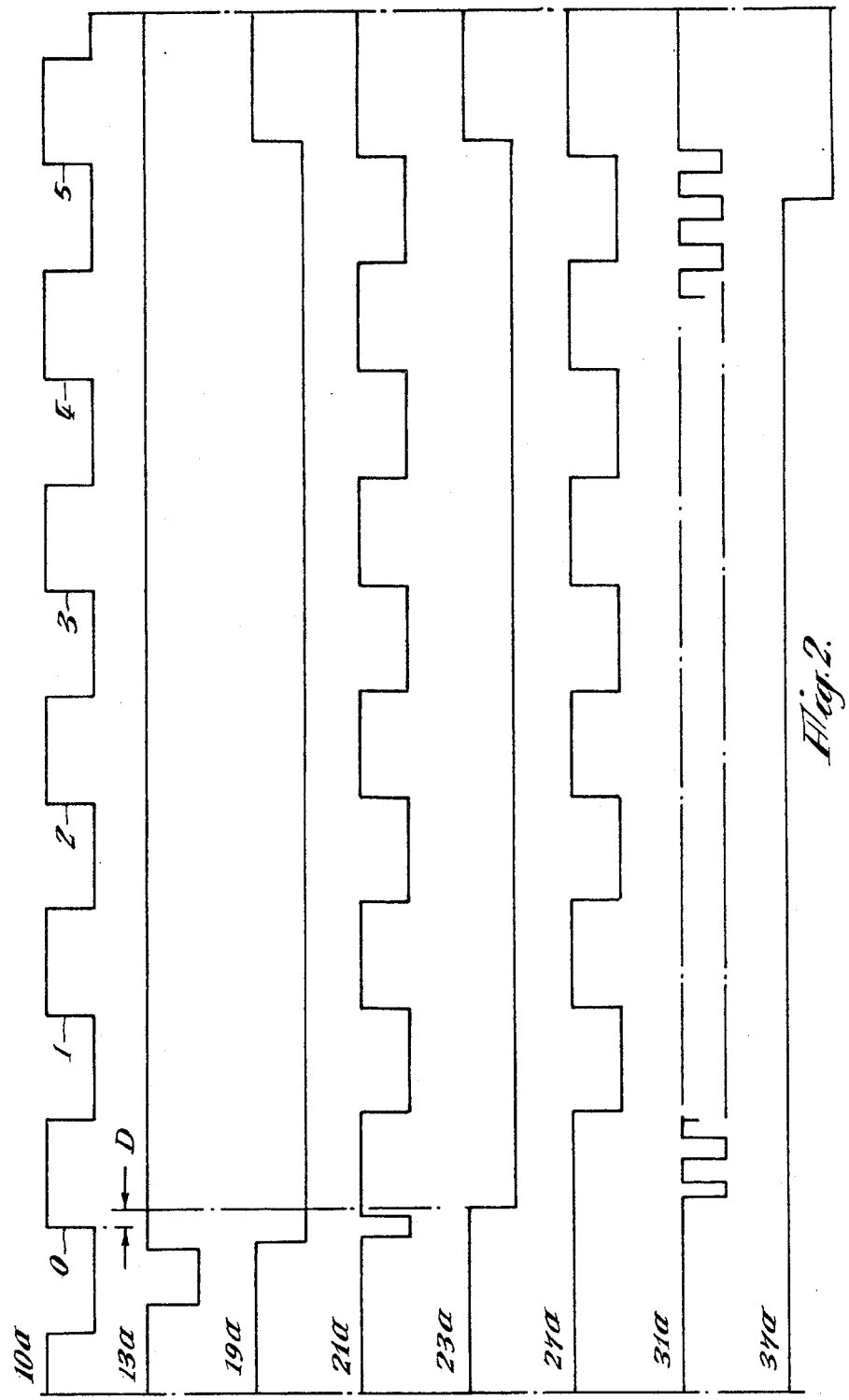

United States Patent Office 3,518,540
Patented June 30, 1970

3,518,540
FREQUENCY MEASURING APPARATUS HAVING A VARIABLE TIME BASE
Eric Roberts, London, England, assignor, by mesne assignments, to Rolls-Royce Limited, Derby, England, a British company
Filed July 6, 1967, Ser. No. 651,463
Claims priority, application Great Britain, July 8, 1966, 30,681/66
Int. Cl. G01r 23/00
U.S. Cl. 324—79       2 Claims

ABSTRACT OF THE DISCLOSURE

The disclosure of this invention pertains to apparatus wherein an unknown frequency is measured by simultaneously counting cycles of the unknown and cycles of a known frequency. The counting is started by the end of the cycle of the unknown frequency in which a start signal is given, and the counting is stopped by the end of the cycle of the unknown frequency in which the count of the known frequency reaches a constant. Thereby the time taken by the counting is substantially constant.

---

This invention relates to frequency measuring apparatus.

It is known to measure the frequency of a signal by counting the number of cycles of a known frequency over a period equal to at least one cycle of the unknown frequency. The time taken by such a measurement with the unknown frequency, i.e. the lower the unknown frequency the longer is the time required for the measurement. It is an object of the invention to ensure that the measurement can be made over a time period which is substantially constant irrespective of the frequency to be measured.

According to this invention there is provided frequency measuring apparatus comprising a first channel for carrying a first signal being a cyclic of unknown frequency, a second channel for carrying a second signal being a cyclic signal of known frequency, a third channel for carrying a start signal, a first and a second digital counter, gating means having inputs connected to the first and third channels and an output to the two counters, the gating means being responsive to the simultaneous presence of a start signal and a determined part in a cycle of the first signal to connect hte first and second channels respectively to the first and second counters for the cycles of the first and second signals to be counted, means for stopping the counters, and further gating means having inputs connected to the second counter and to the first channel and having an output connected to the stopping means, the further gating means cooperating to stop both counters in response to the simultaneous presence of a determined number in the second counter and said determined part in a cycle of the first signal.

It will be seen that the output of the apparatus is a count of cycles of the known frequency and a count of cycles of the unknown frequency, and that the time of such counting is substantially constant because it depends on the time required for the count of the cycles of the known frequency to reach said determined number.

An example of apparatus according to this invention will now be described with reference to the accompanying drawings wherein:

FIG. 2 is a diagram of the wave forms of the signals carried by the channels of the circuit shown in FIG. 1. The signals have the same reference numerals as the channels with the suffix $a$ added.

Figure 1:
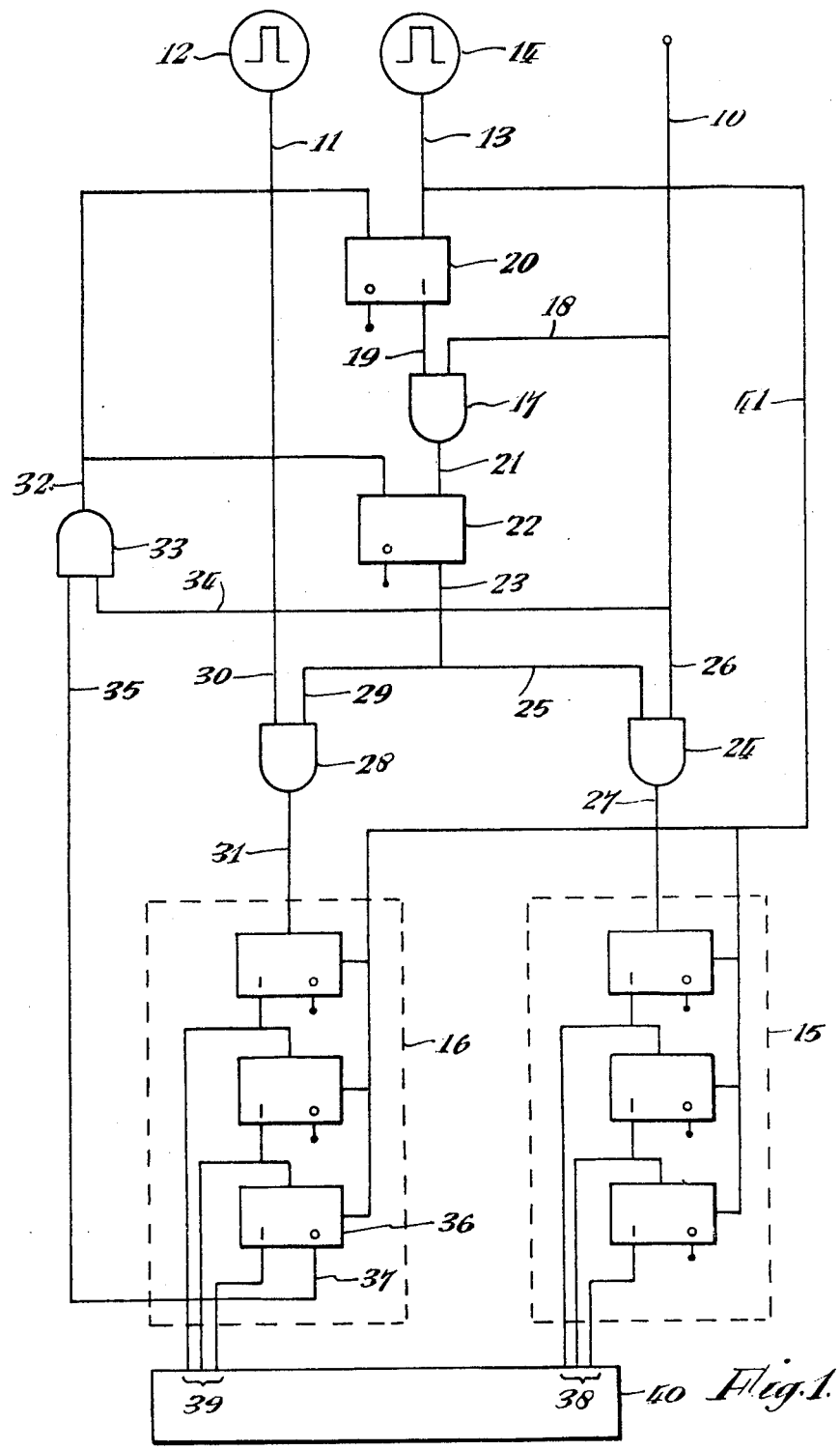
FIG. 1 is a logic diagram of the apparatus.

Referring to FIGS. 1 and 2, there is shown a first input channel 10 (FIG. 1) to which is fed a cyclic signal 10$a$ (FIG. 2) of unknown frequency, i.e. of the frequency to be measured. A second input channel 11 carries a cyclic signal 11$a$ of known constant or reference frequency, the signal 11$a$ being generated by an oscillator 12. A third input channel 13 carries a start signal 13$a$ generated at regular intervals by an oscillator 14 and used to initiate the process whereby the frequency of the signal 10$a$ is measured.

The cycles of the signal 10$a$ are counted by a binary counter 15. The cycles of the signal 11$a$ are counted by a binary counter 16. The counters 15, 16 are connected as follows. An AND gate 17 has an input 18 from the channel 10 and an input 19 from the channel 13, the latter input being derived from a storage flip-flop 20 connected to the channel 13. The gate 17 has an output 21 connected into a storage flip-flop 22 having an output 23 connected to an input 25 of an AND gate 24 which has another input 26 from the channel 10 and which has an output 27 connected to activate the counter 15. The output 23 from the flip-flop 22 is also connected to an input 29 of an AND gate 28 having another input, 30, from the channel 11 and having an output 31 connected to activate the counter 16.

It should be noted that all the signals transmitted through the apparatus are of square pulse form and that it is only the rising step of each pulse which can activate a flip-flop to which the signal is connected. In FIG. 2 the rising steps of the signal 10$a$ are denoted 0, 1, 2, 3, 4, 5. Gates are activated by the low level of a signal.

It will now be seen that the simultaneous occurrence of the low level of the signal 19$a$ and of the rising step of a signal 10$a$ activates the output 21 of the gate 17 and sets the flip-flop 22 to enable the gates 24, 28 to transmit to the counters 15, 16 any cycles of the signals 10$a$, 11$a$ which occur after the flip-flop 22 has been set.

The gate 17 and flip-flop 22 are chosen so that their operation requires a time period exceeding the time required for a rising step of the signal 10$a$. As a result the step 0 of the signal 10$a$, which is the first step to occur after the occurrance of the signal 13$a$, is not transmitted to the counter 15 because the step 0 will be gone by the time the output of the gate 17 reaches the output 23. This delay, which is indicated "D" in FIG. 2, is necessary simply to avoid counting a zero in the number of cycles of the signal 10$a$. Instead of relying on the delay inherent in the elements 17, 22, a separate delay element (not shown) can be introduced in the line 23. After the flip-flop 22 has been set by the output of the gate 17, the latter gate plays no further part in the operation; the inputs 25, 29 are held "on" by the flip-flop 22 and the inputs 26, 30 operate the counters.

It will be seen that the gate 17 constitutes a means responsive to the simultaneous presence of the start signal 13$a$ (as stored by the flip-flop 20) and a determined part (that is, a rising step) of the signal 10$a$ to connect the channels 10, 11 to the counters. Subsequently, the output 23 of the flip-flop 22 constitutes the stored start signal and the gates 24, 28 constitute means responsive to the simultaneous presence of a start signal and determined parts of the signals 10$a$, 11$a$ to connect the channels 10, 11 to the counters.

The flip-flops 20, 22 also constitute a means for stopping the counting operation inasmuch as activation of a line 32 causes these flip-flops to be re-set. Such resetting is carried out by means of an AND gate 33 having an input 34 from the channel 10 and an input 35 from the counter 16. The latter counter comprises an in-series grouping, well-known per se, of flip-flops each having an input successive activations of which result in alternate activation and deactivation of an output. Each flip-flop represents a binary digit. The input 35 is derived from the output, 37, of one of the flip-flops, 36, of the counter such that when the number represented by the output 37 is reached the input 35 is activated. The gate 33 is activated by the rising step of the signal 10a next following the activation of the input 35, and, as stated, the output of the gate 33 re-resets the flip-flops 20, 22 to stop the counting. The gate 33 therefore defines a means cooperating to stop both counters in response to the simultaneous presence of a determined number in the counter 16 and a rising step in a cycle of the signal 10a.

Regarding each rising step of the signal 10a as the end of a cycle of that signal, it may be said that the counting of cycles of the reference signal 11a starts with the end of the cycle of the signal 10a in which the start signal was given; that the counting of the cycles of the signal 10a starts one cycle later to avoid counting a zero; and that the counting of both the signals 10a, 11a is stopped with the end of the cycle of the signal 10a in which the counter 16 has reached a determined number. It is clear that the time over which the measurement is made is therefore equal to the constant time taken by the counter 16 to reach said determined number plus the time taken by at most two cycles of the unknown signal 10a.

The outputs, denoted 38, 39, of the counters 15, 16 are connected to a computer 40 which forms the quotient of the two counts multiplied by the frequency in cycles per second of the signal 11a thereby to produce the actual value of the unknown frequency in cycles per second.

The channel 13 is connected to the counters 15, 16 by a re-set line 41 to zero the counters prior to a new count being started.

For simplicity the counters 15, 16 are shown each to have three digits only. This means that the total capacity of the counters is binary 111 (decimal 7) and the signal 37a is generated on the count of binary 100 (decimal 4). A greater capacity is of course obtainable simply by increasing the number of digits.

The apparatus is suitable for determining the unknown frequency at short discrete time intervals being the intervals between successive start signals 13. The signal 10a may be a measure of rotational speed of an engine whose speed is controlled by a digital closed loop system, the output from the counters being used as the feedback of actual engine speed.

What we claim is:

1. Frequency measuring apparatus comprising a first channel for carrying a first signal being a cyclic signal of unknown frequency, a second channel for carrying a second signal being a cyclic signal of known frequency, a third channel for carrying a start signal, a first and a second digital counter, gating means having inputs connected to the first and third channels and an output to the two counters, the gating means being responsive to the simultaneous presence of a start signal and a determined part in a cycle of the first signal to connect the first and second channels respectively to the first and second counters for the cycles of the first and second signals to be counted, means for stopping the counters, and further gating means having inputs connected to the second counter and to the first channel and having an output connected to the stopping means, the further gating means cooperating to stop both counters in response to the simultaneous presence of a determined number in the second counter and said determined part in a cycle of the first signal.

2. Apparatus according to claim 1 wherein the connection between the first-mentioned gating means and the third channel includes means cooperating to prevent counting of the cycle of the first signal during which the start signal occurred.

References Cited

UNITED STATES PATENTS

| | | |
|---|---|---|
| 2,769,595 | 11/1956 | Bagley. |
| 2,851,596 | 9/1958 | Hilton _____ 324—78 X |
| 3,280,937 | 10/1966 | Faber et al. _____ 324—79 X |
| 3,304,504 | 2/1967 | Horlander. |
| 3,450,991 | 6/1969 | Tarczy-Hornoch _____ 324—79 |

ALFRED E. SMITH, Primary Examiner